(12) United States Patent
Galley et al.

(10) Patent No.: US 9,163,187 B2
(45) Date of Patent: Oct. 20, 2015

(54) GASIFICATION OF COMBUSTIBLE ORGANIC MATERIALS

(75) Inventors: David Galley, Paris (FR); Pierre Jeanvoine, Saint-Germain-en-Laye (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 1295 days.

(21) Appl. No.: 12/936,950

(22) PCT Filed: Apr. 8, 2009

(86) PCT No.: PCT/FR2009/050614
§ 371 (c)(1),
(2), (4) Date: Dec. 22, 2010

(87) PCT Pub. No.: WO2009/136072
PCT Pub. Date: Nov. 12, 2009

(65) Prior Publication Data
US 2011/0107670 A1    May 12, 2011

(30) Foreign Application Priority Data

Apr. 9, 2008 (FR) .................................. 08 52382

(51) Int. Cl.
*C01B 3/36* (2006.01)
*C10J 3/57* (2006.01)
(Continued)

(52) U.S. Cl.
CPC ... *C10J 3/57* (2013.01); *C01B 3/32* (2013.01); *C01B 3/50* (2013.01); *C01B 2203/025* (2013.01);
(Continued)

(58) Field of Classification Search
CPC .................................................... C10J 3/57
See application file for complete search history.

(56) References Cited

U.S. PATENT DOCUMENTS 2,685,506 A * 8/1954 Schereschewsky ............. 75/658
3,849,120 A * 11/1974 Norman ........................... 75/629
(Continued)

FOREIGN PATENT DOCUMENTS

EP    1 148 295    10/2001
FR    1 006 866    4/1952
(Continued)

OTHER PUBLICATIONS

Office Action issued May 28, 2013, in Japanese Patent Application No. 2011-503480 (submitting English translation only).
(Continued)

*Primary Examiner* — Imran Akram
(74) *Attorney, Agent, or Firm* — Oblon, McClelland, Maier & Neustadt, L.L.P.

(57) ABSTRACT

The invention relates to a process for manufacturing a combustible gas having a lower heating value of at least 1 $MJ/Nm^3$, comprising the reaction of an oxidizing gas comprising steam or oxygen or $CO_2$ with an organic material in contact with a molten silicate bath held in a tank and comprising a heat supply into the molten silicate, said process operating continuously, silicate being regularly drained from the tank and vitrifiable materials being regularly introduced in order to feed the silicate bath. The heat supply is preferably of the submerged combustion type. The invention also relates to a continuous industrial manufacturing process comprising continuous production, in an industrial production unit comprising a gaseous fuel burner that generates combustion gases; continuous production of steam in a boiler; and continuous production of combustible gas in a unit for producing combustible gas comprising the reaction of an oxidizing gas comprising steam with an organic material, the combustion gases being conveyed to the boiler in order to vaporize water and produce steam, the steam produced by the boiler being conveyed to the unit for producing combustible gas in order to react with the organic material, the combustible gas being conveyed to the industrial production unit in order to be burnt therein as a gaseous fuel.

15 Claims, 2 Drawing Sheets

Figure 1:
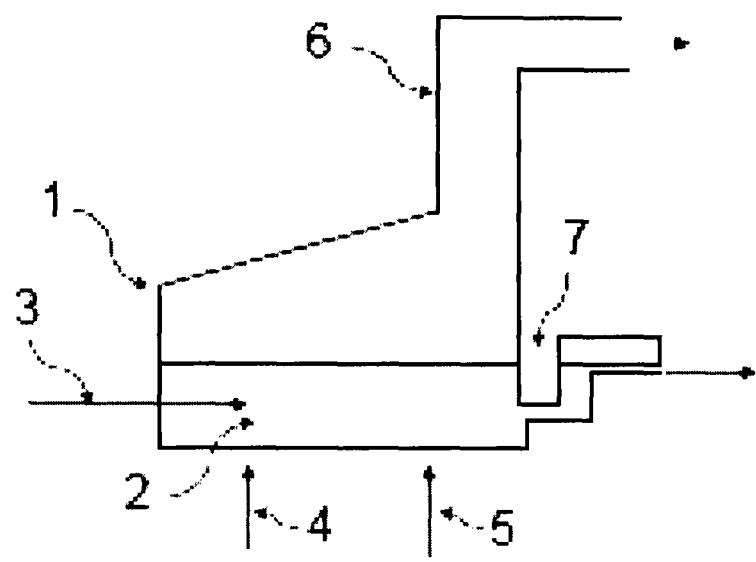

(51) Int. Cl.
*C01B 3/32* (2006.01)
*C01B 3/50* (2006.01)

(52) U.S. Cl.
CPC . *C01B 2203/0216* (2013.01); *C01B 2203/0222* (2013.01); *C01B 2203/04* (2013.01); *C01B 2203/048* (2013.01); *C01B 2203/0495* (2013.01); *C01B 2203/06* (2013.01); *C01B 2203/085* (2013.01); *C01B 2203/0811* (2013.01); *C01B 2203/0833* (2013.01); *C01B 2203/0866* (2013.01); *C01B 2203/0872* (2013.01); *C01B 2203/0894* (2013.01); *C01B 2203/1211* (2013.01); *C01B 2203/1258* (2013.01); *C01B 2203/14* (2013.01); *C10J 2300/0916* (2013.01); *C10J 2300/0956* (2013.01); *C10J 2300/0973* (2013.01)

(56) References Cited

U.S. PATENT DOCUMENTS

| | | | | |
|---|---|---|---|---|
| 3,933,127 | A * | 1/1976 | Arps | 122/1 R |
| 3,980,543 | A * | 9/1976 | Eckfeldt | 204/423 |
| 3,989,010 | A * | 11/1976 | Arps | 122/1 R |
| 4,216,199 | A | 8/1980 | Erickson | |
| 4,345,990 | A * | 8/1982 | Fahlstrom et al. | 208/404 |
| 4,522,648 | A * | 6/1985 | Kunicki et al. | 95/235 |
| 4,643,766 | A * | 2/1987 | Kieger | 75/545 |
| 4,857,229 | A * | 8/1989 | Najjar et al. | 252/373 |
| 5,059,404 | A | 10/1991 | Mansour et al. | |
| 5,280,757 | A * | 1/1994 | Carter et al. | 110/346 |
| 5,306,481 | A | 4/1994 | Mansour et al. | |
| 5,403,366 | A * | 4/1995 | Leininger et al. | 48/197 R |
| 5,820,814 | A | 10/1998 | Doumet | |
| 6,416,599 | B1 * | 7/2002 | Yoshikawa et al. | 149/45 |
| 2002/0033123 | A1 | 3/2002 | Yamamoto et al. | |
| 2003/0130360 | A1 * | 7/2003 | Kindig et al. | 518/703 |
| 2004/0079087 | A1 | 4/2004 | Chandran et al. | |
| 2006/0228294 | A1 | 10/2006 | Davis et al. | |
| 2007/0012045 | A1 | 1/2007 | Chandran et al. | |
| 2007/0119099 | A1 * | 5/2007 | Wallace | 48/197 FM |
| 2007/0191208 | A1 * | 8/2007 | Teyssedre et al. | 501/71 |
| 2009/0320369 | A1 | 12/2009 | Guyomarc'h et al. | |
| 2011/0158858 | A1 * | 6/2011 | Alves Ramalho Gomes | 422/187 |

FOREIGN PATENT DOCUMENTS

| | | |
|---|---|---|
| FR | 2 735 791 | 12/1996 |
| GB | 2 016 036 A | 9/1979 |
| JP | 50-122485 A | 9/1975 |
| JP | 54-118403 A | 9/1979 |
| JP | 2006 036804 | 2/2006 |
| RU | 2102490 | 1/1998 |
| WO | 04 000723 | 12/2003 |
| WO | WO 2009/110706 A2 | 9/2009 |
| WO | WO 2009/110706 A3 | 9/2009 |

OTHER PUBLICATIONS

Eurasian Office Action issued Jul. 11, 2013 in Patent Application No. 201071176 with English Translation.

MacCormac, M. et al., "The Gasification of Coal in an Experimental Rummel Double-Shaft Slag-Bath Gasifier", Institution of Gas Engineers Journal, vol. 5, pp. 385-399, ( May 1, 1965) XP 008098610.

Emery, J. J. "Slag Utilization in Pavement Construction", Extending Aggregate Resources, ASTM (American Society for Testing and Materials), Speical Technical Publication (STP), No. 774, pp. 95-117 (Jan. 1, 1982) XP008098625.

Office Action issued Jan. 17, 2013 in Eurasian Patent Application No. 201071176 English translation only.

International Search Report issued Sep. 9, 2010 in PCT/FR09/050614 filed Apr. 8, 2009.

MacCormac, M. et al., "The Gasification of Coal in an Experimental Rummel Double-Shaft Slag-Bath Gasifier", Institution of Gas Engineers Journal, vol. 5, pp. 385-399, (May 1, 1965) XP 008098610.

Emery, J. J. "Slag Utilization in Pavement Construction", Extending Aggregate Resources, ASTM (American Society for Testing and Materials), Speical Technical Publication (STP), No. 774, pp. 95-117 (Jan. 1, 1982) XP008098625.

\* cited by examiner

GASIFICATION OF COMBUSTIBLE ORGANIC MATERIALS

CROSS REFERENCE TO RELATED APPLICATION

This application is a U.S. National Stage Application of PCT/FR2009/050614, filed on Apr. 8, 2009, the text of which is incorporated by reference, and claims priority to French Application No. 0852382, filed on Apr. 9, 2008, the text of which is also incorporated by reference.

The invention relates to a process and to a device for converting a combustible solid material or combustible liquid material into a combustible gas.

The objective of the invention is to produce a combustible gas directly from combustible solid or liquid materials such as biomass and/or waste products such as used tires, plastics, autoshredder residues, sludges, replacement combustible materials (known as "RCM"), or even household waste, etc., or indirectly from the same materials previously converted to oil after a first pyrolysis operation.

According to the invention, a technology is proposed that aims to replace the use of fossil energies in industrial processes, to lower the $CO_2$ emissions in the atmosphere and the cost of the energy. Specifically, for the purpose of reducing the concentration of greenhouse gases in the atmosphere, industrialists are encouraged by an appropriate fiscal policy to use not fossil energies (oil, natural gas), since this brings still more carbon and $CO_2$ to the surface of the earth, but renewable fuel such as biomass which, while it is growing, absorbs from the atmosphere the $CO_2$ which will then be discharged via its combustion. However, it is still not possible to use biomass directly in industrial processes, in particular because it is subject to the composition of this biomass, which generally leads to ashes.

It has already been proposed to generate a combustible gas from biomass by pyrolyzing the latter at more than 500° C. or even more than 1000° C. in fixed or fluidized beds comprising ceramic beads or rollers over which steam and/or air or pure oxygen travel. However, the ashes derived from the biomass accumulate in the bed which does not fail to block the latter. A gasifier of this type must therefore be regularly shut down and cleaned.

The article by Maccormac "Gasification of coal in an experimental Rummel double-shaft slag-bath gasifier", IGE Journal, Vol. 5, 1 May 1965, pp 385-399 teaches the gasification of coal in a slag. Submerged combustion in the slag was tested but abandoned following problems created by an abundant formation of foam and also the precipitation of iron. Coal and also most of the organic materials of biomass type in fact contain iron. Even without submerged combustion, foam is formed and iron precipitates, requiring the shutdown of operations. Metallic iron is difficult to discharge since it requires very high temperatures, of around 1500° C.

A process has now been found that operates continuously making it possible to gasify organic material in a molten mass, while avoiding the precipitation of iron. According to the invention, a silicate is used as the molten mass and said silicate is continuously renewed by discharging it and replacing it regularly during the operation. This continuous renewal of the silicate bath makes it possible to continuously discharge the iron, the concentration of which thus remains below its precipitation limit. Due to its high silica content, the silicate foams little or not at all and furthermore it dissolves iron well. The low tendency of the silicate to foam even makes it possible to provide a heat supply in the molten silicate by submerged combustion.

According to the invention, the gasification of the organic material that produces a combustible gas comprises the reaction of steam or of oxygen or of $CO_2$ with an organic material in contact with a molten silicate, heat being supplied in the molten silicate. The expression "or" in the previous sentence then actually covers the expression "and/or". The expression "in contact" covers the fact that the organic material may be on top of the silicate bath, as supernatant, or be inside the silicate bath, or both in and on the silicate bath.

Preferably, the oxidizing gas that reacts with the organic material contains at least 30% by volume of water. It may even contain 100% water. The oxidizing gas may also be oxygen, which may be provided by the air. Thus, the gas for reaction with the organic material may be air or oxygen-enriched air. The air may be humid. It may be air loaded with steam. Thus, air may provide both oxygen, water and $CO_2$.

The process according to the invention has the following advantages:

the gas produced has a high LHV (lower heating value), in particular from 5 to 25 $MJ/Nm^3$;

the ashes that may contain undesirable oxides and heavy metals are rendered inert (neutralized) in a glassy mass, which may be discharged continuously during the gasification and which may be granulated for disposal (as class 3, that is to say classed as an inert and non-dangerous waste) or use as granules in civil engineering for example as a filler for bitumen or asphalt type materials for roads, pavements or other construction materials; and the process is compact and of limited investment, and may operate in an automated and continuous fashion.

Thus, the process according to the invention is both a system for producing combustible gas (of the "synthesis gas" or "syngas" type, comprising CO and hydrogen) and a system for producing construction materials. The fact that the silicate is liquid makes the operation of the entire system easy since the ashes of the organic material are entrained by the flow of silicate out of the tank. The renewal of the silicate in the bath is such that it maintains a high silica content, generally at least 40% by weight of silica.

The process according to the invention relies on the principle of gasification in a molten silicate medium at high temperature by a relatively oxidizing gas compared to carbon. Within the context of the present application, the gas that reacts with the organic material may be called an "oxidizing gas". The gas is not completely oxidizing relative to carbon since it is not a question of creating excessive $CO_2$, but on the other hand it is sought to produce the largest amount possible of reducing gas such as CO and $H_2$. This gasification reaction is in fact endothermic and this is why an energy (or heat) supply is provided to the system directly within the silicate bath.

Thus, the invention firstly relates to a process for manufacturing a combustible gas having a lower heating value of at least 1 $MJ/Nm^3$, comprising the reaction of an oxidizing gas comprising steam or oxygen or $CO_2$ with an organic material in contact with a molten silicate and comprising a heat supply to the molten silicate.

The temperature of the silicate is adjusted between 800° C. and 1700° C. depending on its chemical composition. It comprises silica and at least one oxide from the following group: CaO, $Fe_2O_3$, $Na_2O$, $K_2O$. The oxide added to the silica has the role of reducing the viscosity of the silica in order to achieve a sufficient fluidity favorable to stirring and therefore to the desired reactions. The targeted viscosity generally ranges from 10 to 1000 poise and preferably 20 to 500 poise at the operating temperature.

All of the silicates within the meaning of the invention cover, in particular, slags, glass and silicates that are more or less water-soluble such as the silicates of alkali metals (such as Na, K) and/or of alkaline-earth metals (such as Ca, Mg), optionally in the form of mixed silicates (several alkali metal and/or alkaline-earth metal silicates).

The silicate generally comprises 40 to 80% by weight of $SiO_2$. It also comprises at least one other oxide in order to fluidize the bath, said oxide possibly generally being chosen from the following group: $CaO$, $Fe_2O_3$, $Na_2O$, $K_2O$.

Thus, the silicate may specially comprise:
0 to 20% by weight of $CaO$;
0 to 20% by weight of $Fe_2O_3$;
0 to 20% by weight of an alkali metal oxide such as $Na_2O$ or $K_2O$ (which covers $Na_2O$ and/or $K_2O$), the sum of the mass of $CaO+Fe_2O_3$+alkali metal oxide not generally being 0 and preferably ranging from 5 to 60% by weight.

It may also comprise, in particular, $MgO$, $Al_2O_3$, $TiO_2$, $MnO_2$, $P_2O_5$, $SO_2$, $Cl$.

One particularly suitable silicate composition contains:
60 to 80% by weight of $SiO_2$;
10 to 20% by weight of $CaO$;
5 to 15% by weight of $Fe_2O_3$; and
2 to 10% by weight of alkali metal oxide (such as $Na_2O$ or $K_2O$, which covers $Na_2O$ and/or $K_2O$).

The oxide added to the silica has the role of reducing the viscosity of the silicate in order to achieve a sufficient fluidity that is favorable to stirring and therefore to the desired reactions. The targeted viscosity generally ranges from 10 to 1000 poise and preferably from 20 to 500 poise at the operating temperature, that is to say between 800° C. and 1700° C.

The molten silicate may especially be contained in a tank equipped with a refractory lining with an overflow system having a siphon (or groove) for discharging the excess molten silicate.

The silicate is kept molten due to the heat supply that may be of electric type (generally electrodes embedded in the silicate such as electrodes made of molybdenum, graphite, or iron according to practices that are well known in the glass industry) or which may originate from the injection of an oxidizer which partially burns the carbon resulting from the gasification of the combustible materials introduced into the silicate, optionally with a supply of another combustible gas. This combustible gas which is added may be actual combustible gas (syngas) produced by the device according to the invention, after optional cooling, purification, filtration and compression, or a gas that is not produced by the installation such as hydrogen or a fossil natural gas or a mixture of syngas with one or the other of the preceding two gases, or else a liquid fuel. The purification mainly serves to eliminate water and the filtration mainly serves to remove dust and tar. The heat supply to the molten silicate, such as this exothermic combustion reaction, is generally the only supply of energy. It is also possible to combine an electric heating and a heating via combustion. Within the context of the invention, the heat supply is carried out within the silicate itself by a submerged means, especially of the submerged electrode or submerged combustion type. In the case of a combustion, an oxidizer is injected into the silicate, which is generally oxygen, which is perhaps supplied by the air. Thus, it is possible to use, as an oxidizer, pure oxygen, air or oxygen-enriched air. Preferably, use is made of an oxidizer comprising more than 80 vol % of pure oxygen or even pure oxygen since this involves a reduced volume of gas (as compared to air for example), which further reduces the tendency to form foam. Submerged combustion is a preferred means for supplying heat as it contributes to the mixing of the materials in the molten silicate bath. This mixing leads to a better homogeneity of the bath, which is favorable to the absence of precipitations such as that of iron. Furthermore, it is preferred that the flame thereof is oxidizing since this leads to oxidation of the metal particles in suspension, which further prevents precipitations such as that of iron. The excess oxygen for this submerged combustion has a twofold role: 1) preventing the precipitation of metal and 2) the surplus oxygen can participate in the gasification reaction. The gases injected into the silicate for this submerged combustion make the particles that are optionally being formed rise. The use of an oxidizer having a high degree of oxygen or of pure oxygen for this submerged combustion is therefore an excellent compromise permitting the mixing of the bath and the virtual absence of metallic iron without giving rise to too much foam.

The solid or liquid combustible materials to be gasified are preferably introduced within the molten silicate (below the level of the liquid surface of the silicate) by means of a suitable charger (screw or piston system, pump in the case of a liquid, etc.). They may also be introduced above the surface of the molten silicate.

Depending on the gas chosen to react with the organic material, the gasification is carried out via at least one of the following reactions:

$$H_2O+C \rightarrow CO+H_2 \quad (1)$$

$$2H_2O+C \rightarrow CO_2+2H_2 \quad (2)$$

$$C+CO_2 \rightarrow 2CO \quad (3)$$

$$C+\tfrac{1}{2}O_2 \rightarrow CO \quad (4)$$

these reactions being endothermic.

Where appropriate, if the supply of heat to the silicate is carried out via submerged combustion, the combustion reaction of the oxygen with the carbon of the organic material and/or the syngas takes place according to:

$$C+O_2 \rightarrow CO_2 \quad (5)$$

$$(CO+H_2)+O_2 \rightarrow CO_2+H_2O \quad (6)$$

these reactions being exothermic.

The water and the $CO_2$ may thus especially result from the submerged combustion of the syngas or of a mixture of syngas with $CH_4$ and/or $H_2$ and/or any other combustible gas with the advantage of then being injected, in the correct proportions, into the mass to be gasified at high temperature. Additional water may also be introduced in the form of vapor or moisture from the organic materials introduced.

The production of CO or $H_2$ from the organic material is endothermic and this is why a heat supply is introduced. The heat supply is generally limited to the minimum necessary to compensate for the heat losses of the device and of the endothermic gasification reaction, and also, where appropriate, to heat the incoming gases ($H_2O$, air, $O_2$, $CO_2$).

In the case where the heat supply is provided by submerged combustion, it is possible to separate this combustion from the location where the oxidizing gases necessary for the gasification will be injected, this being for the purpose of increasing the heating value of the combustible gas produced. In this case, it is advisable to provide a permanent supply of heat to the zone of reaction with the oxidizing gas, originating from the submerged combustion zone. This can be carried out by circulating the liquid silicate relative to the fixed points for injection of the combustible materials, of the oxidizing gas and of the oxidizer.

This circulation can be carried out, for example, by natural convection that is the result of a difference in temperature and/or in depth of the tank, or by stirring (especially rotation) of the silicate in particular by means of a stirrer, for example a metallic stirrer, especially made of resistant steel, especially having a variable speed, especially of the magnetohydrodynamic (MHD) type, or by movement (for example rotation) of the tank itself, or by any other means. In this case, there are two gaseous fluid outlets: 1) the combustible gas that is sent to its use, and 2) the flue gases from combustion of the residual carbon (not converted to combustible gas) and/or from the submerged combustion which rejoin another circuit such as, for example, that of the main flue gases from the user industrial furnace. The separation of these two gases (combustible gas produced on the one hand and combustion gas on the other hand) is ensured by virtue of two separate chimneys, one being placed in the vicinity and even just above the duct for introducing the oxidizing gas (water or $O_2$ or $CO_2$) and the other being placed in the vicinity and even just above the duct for introducing the oxidizer. Thus, the invention also relates to the process according to which the submerged combustion on the one hand and the reaction between the oxidizing gas and the organic material on the other hand are carried out in zones that are sufficiently separated so that the combustion flue gases and the combustible gas can be recovered via different chimneys.

Remarkably, the oxidizing gas may be generated at least partially, or even completely, within the molten silicate bath from the submerged combustion which provides it with heat. Specifically, the submerged combustion between a fuel and an oxidizer generates water and $CO_2$ which will rise in the form of bubbles in the silicate bath in order to then react with the organic materials which are for the most part found in the top part of the bath more or less as supernatant. The fuel may be a portion of the actual combustible gas created according to the invention and that is reinjected into the bath. It is also possible to add another fuel to this actual combustible gas, but that is not strictly necessary.

The combustible gas produced according to the invention contains hydrogen ($H_2$) and carbon monoxide (CO). It generally also contains methane ($CH_4$). The sum of the molar percentages of hydrogen and of carbon monoxide is at least 10% and even generally at least 30% or even at least 35%. These percentages of reducing gases ($H_2$ and CO) are achieved once the oxidizing gas encounters enough organic material in its progression.

This combustible gas generally has a lower heating value of at least 1 $MJ/Nm^3$ and even generally of at least 5 $MJ/Nm^3$ and may even attain at least 10 $MJ/Nm^3$. It is generally less than 30 $MJ/Nm^3$.

The efficiency is the useful energy (energy of the gas produced and used outside) divided by all the input energies (combustible material and possible energy originating from outside). This efficiency generally ranges from 10 to 80%.

The process according to the invention may especially operate continuously: the gas produced exits hot (500° C. to 1300° C.) at the top of the device and may be sent to the industrial process that will use it: glass furnace, electricity generator, metallurgical plant, etc. Since the combustible gas produced is hot, it is advisable, in order to benefit as much as possible from its heat, to bring the device according to the invention close to the installation that will use it, in order to limit heat losses. This also has the advantage of limiting or preventing the condensation of tar in the duct conveying the combustible gas to the installation of use. It is also possible to cool this combustible gas, for example by converting its energy, for example to steam by means of a boiler, where appropriate filtering it (removal of dust), purifying it (removal of water), compressing it and storing it before sending it to the installation of use. In this case, the use may be further away. In a process that operates continuously, the silicate is contained in a tank, some silicate being regularly discharged from the tank and vitrifiable materials are regularly introduced in order to feed the silicate bath.

Certain solid organic materials, especially of the biomass type, may be converted to a viscous liquid (or oil) by pyrolysis at around 500° C. under pressure (like petroleum is formed naturally from organic materials). It is therefore possible, prior to the gasification in the device according to the invention, to convert these organic materials to oil. This provides the advantage of considerably reducing the volume of material to be introduced into the gasifier according to the invention. Furthermore, this material, condensed in the form of oil, becomes transportable insofar as the transport costs then become reasonable, which is not really the case for the initial biomass, which is much too voluminous with regard to the energy that it provides.

The gasification according to the invention may be carried out under pressure, which then makes it possible to deliver the combustible gas under pressure. This may be desired, especially to achieve sufficient pulses of combustible gas to the burners of the end use. Gasification under pressure is easier to carry out from an oil since the charging of the oil may be carried out using a pump.

The combustible gas generated by the device according to the invention may be used to feed, as a fuel, a burner of an industrial furnace, such as a glass furnace. This gas is then burnt by the secondary air (the primary air then being that injected into the silicate), which may have undergone a thermal regeneration in a regenerator according to the principle well known to a person skilled in the art of the glass industry (alternation of flue gases/air in regenerators).

Where appropriate, the combustible gas generated according to the invention may be heated before being burnt in its end use (it is referred to as double regeneration if the oxidizer and the fuel are both reheated). However, this is not necessarily advantageous if the gas produced is of high heating value and if it is already sufficiently hot. It is therefore an advantage of the process according to the invention when the combustible gas is used directly after its synthesis since this gas is generated hot, which is advantageous in certain applications such as, in particular, combustion in a glass furnace burner.

The combustible gas may optionally exit at a relatively moderate temperature (<500° C.), especially if it is cooled by the freshly introduced layers of organic material or of coal that it passes through in the device. As it is a gas of relatively low LHV (when compared to natural gas), it is preferred to reheat it before burning it in the user furnace (example: glass furnace) in order to obtain the sufficient adiabatic flame temperature, in particular sufficient for melting glass. In order to do this, it is possible to provide a double regeneration system: in a first alternation, the hot flue gases from the combustion in the user furnace (especially glass furnace) heat two regeneration chambers: one for the combustion air (as in modern gas furnaces), the other for the combustible gas. In the following alternation, the gas circuits are reversed and it is then the air and the gas that are heated in these chambers: the two then burn when they arrive in the user furnace producing hot flue gases and giving their heat to the charge. The two air and combustible gas chambers must of course be leaktight with respect to one another to avoid premature combustion or even an explosion.

In order to avoid having to heat the combustible gas before it is used in the user furnace, it is recommended to increase the outlet temperature of the gas exiting the device for manufacturing the combustible gas (known as "gasifier") and its LHV so as to ensure a sufficient adiabatic flame temperature. It is possible to obtain this result via the use of a gasifier having a very high gasification temperature (>1000° C.) and/or that operates with separation of the injections of oxidizer and of oxidizing gas (on the principle of the two chimneys from FIG. 2). Indeed, in this case there is a complete decomposition of the tars and condensables, and a maximization of the $CO/CO_2$ ratio and of the amount of $H_2$ in the combustible gas produced. The gas is sufficiently hot (>500° C.) and its LHV is sufficiently high (>20 kJ/kg) to directly supply the user furnace, especially a glass furnace, without having to pass through a regeneration operation. It then burns when it arrives in the furnace with the combustion air which may have undergone the conventional regeneration. This solution has the advantage of not having to reheat the gas in a ceramic regenerator that is always difficult to make leaktight: thus the risks of premature combustion or of explosion are minimized.

It is possible to produce steam and/or hot air/$O_2$ necessary for the gasifier via a boiler or an exchanger that uses the residual energy of the flue gases. The steam necessary for the process according to the invention as an oxidizing gas may be produced by means of a boiler. This boiler may be installed in the circuit of the main flue gases of a user furnace (such as a glass furnace or another industrial process) for the combustible gas produced according to the invention or in the cooling circuit of the combustible gas produced. The heat from these flue gases or from these gases is used to vaporize the water. In particular, in the case of the existence of two chimneys for collecting the gases (combustion gas on the one hand and combustible gas on the other hand), the boiler may be installed in the circuit of the combustion flue gases that escape from the device according to the invention. Preferably, the steam is at a temperature between 100 and 800° C. under a pressure between 1 bar and 100 bar.

The invention also relates to an industrial device comprising a furnace that uses the combustible gas produced by burning it and of which the heat from the combustion flue gases is used to vaporize the water, which is used, as an oxidizing gas, to produce the combustible gas according to the gasification principle of the invention, the combustible gas produced being reintroduced into the user furnace in order to be burnt therein. This user furnace may be any system that relies on the combustion of a combustible gas such as a glass furnace (melting of the glass, float furnace for conversion to flat glass, etc.). In particular, the furnace may be of the regenerator or recuperator type, that is to say that some of the heat from the flue gases could already have been recovered by a regenerator or recuperator before being sent to the boiler in order to vaporize the water. It is known that the flue gases emerge from such regenerators or recuperators still at high temperatures, generally below 600° C. but generally above 300° C. and this is why the device according to the invention is extremely advantageous since this heat, usually discharged into the atmosphere with the flue gases, is very effectively used here to vaporize the water in the context of an energy-producing system. Thus the invention also relates to an industrial device comprising:

- a production unit comprising a gaseous fuel burner that generates combustion gases;
- a boiler that produces steam (naturally, this covers the fact that there could be several boilers);
- a unit for producing combustible gas comprising the reaction of an oxidizing gas comprising steam with an organic material, the combustion gases being conveyed to the boiler in order to vaporize the water and to produce steam, the steam produced by the boiler being conveyed to the unit for producing combustible gas in order to react with the organic material, the combustible gas being conveyed to the production unit in order to be burnt therein as a gaseous fuel. Within this context, the unit for producing combustible gas may operate according to the process of the invention, that is to say with a silicate bath, but it may also be a unit that operates according to the known fixed or fluidized bed principles.

Thus, the invention also relates to the continuous industrial manufacturing process that uses the industrial device which has just been described. This process comprises:

- continuous production, in an industrial production unit comprising a gaseous fuel burner that generates combustion gases;
- continuous production of steam in a boiler; and
- continuous production of combustible gas in a unit for producing combustible gas comprising the reaction of an oxidizing gas comprising steam with an organic material, the combustion gases being conveyed to the boiler in order to vaporize water and produce steam, the steam produced by the boiler being conveyed to the unit for producing combustible gas in order to react with the organic material, the combustible gas being conveyed to the industrial production unit in order to be burnt therein as a gaseous fuel.

The organic materials that may be introduced into the silicate may be combustible solid or liquid materials such as biomass and/or waste products such as used tires, plastics, autoshredder residues, sludges, replacement combustible materials (referred to as "RCM"), or even household waste. The organic materials may be of biological nature or may be derived from the agri-food industry. They may be animal meal. They may be biomass, in particular of the type: straw, *Miscanthus* stems, etc. They may also be coal, lignite, bituminous shale, peat, etc. These materials may also be wood waste or wastepaper from the paper-making industry. They may also be composed of organic polymers, for example polyethylene, polypropylene, polystyrene, tire residues, or shredding of automotive components. The organic materials may be intimately mixed with inorganic materials that will usefully enrich the composition. For example, these may be sand polluted by an oil spill, the sand enriching the silicate with silica whereas the polluting hydrocarbon is a source of the combustible gas. It is also possible to gasify natural sands that contain hydrocarbons such as bituminous shales. They may also be glass/plastic composites. Mention may be made of laminated glazing units for example that combine at least one glass with at least one sheet of a thermoplastic or non-thermoplastic polymer, of the polyvinyl butyral PVB, ethylene/vinyl acetate EVA, polyurethane PU or polyethylene terephthalate PET type. Mention may also be made of composite materials based on a polymer reinforced by glass yarn (or carbon yarn or another type of reinforcing yarn), used in the automotive industry, or in boats for example. Mention may also be made of glass/metal composites (glazing units equipped with connecting elements, of metallic coatings). Thus, the device according to the invention may be used for recycling organic waste.

The silicate is progressively charged with mineral ashes from the combustible material introduced. It is possible to discharge it continuously, especially by means of an overflow having a siphon (to prevent the combustible gas from exiting)

connected to the main tank. It is possible to ensure the constancy of the viscosity of the silicate at a given temperature by analyzing its chemical composition and by introducing correcting oxides (CaO, $Fe_2O_3$, etc.) with the combustible materials. The nature and the amount of the correcting oxide depends of course on the nature of the materials introduced.

The device according to the invention may be integrated into an industrial installation (such as a glass furnace) which is then capable of managing completely or partially without fossil fuel. In the case of a use of the gas produced according to the invention in burners, it is possible to provide only a limited number of burners with this gasification gas, the other burners staying with fuel or natural gas. It is therefore possible to thus proportionally reduce the taxable $CO_2$ emissions and it is also possible to lower the price of the energy.

The device according to the invention is of low cost, it uses inexpensive materials and its size is compact compared to those of the prior art which use fixed or fluidized beds.

The organic materials introduced are generally cold in comparison with the temperature of the silicate bath. If the gases formed by the process according to the invention pass close to or in the zone for charging these materials, on the one hand the organic materials are heated by these gases, but on the other hand the gases are cooled, which may present the drawback of generating tar, and furthermore this reduced temperature is possibly less favorable within the context of the end use. This is why the combustible gas produced can advantageously be forced to pass through a hotter zone of the surface of the silicate, preferably situated downstream relative to the silicate flow or discharge direction. This hotter zone is produced, in particular, by a heat supply which may be of electrical origin. It may also be produced by submerged combustion of a portion of the combustible gas produced with $O_2$ or air. This operation is of the "reversed operation" type since the gasification gases (combustible gas created) go in the direction of cold to hot (as in co-current fluidized bed gasifiers). Here, the gases are formed in the first chamber (therefore they may be quite cold since the organic material introduced is cold) but then they are forced to pass into the low zone between the crown and the silicate which heats them with the advantage of decomposing the tar and continuing the gasification. According to the invention, the combustible gas can therefore be heated by passing under a lowered crown before being discharged via a chimney.

FIG. 1 represents the device according to the invention in the embodiment according to which the combustible gas manufactured is not separated from the combustion gases. A tank 1 contains a molten bath of silicate 2 at 1200° C. having a viscosity below 1000 poise, introduced into which, on the surface of the bath, is RCM biomass via an endless screw 3. Also introduced below the level of the surface of the bath are steam at 400° C. via a duct 4 and air at 500° C. via a duct 5. The combustible gas formed mixed with the combustion gas is collected via a single chimney 6. A mixture of vitrifiable materials is continually introduced via the same endless screw in order to keep the composition of the silicate substantially constant. The temperature of the silicate bath is maintained by electrodes. The silicate is discharged continuously as a function of the change in its composition via the channel 7.

Figure 2:
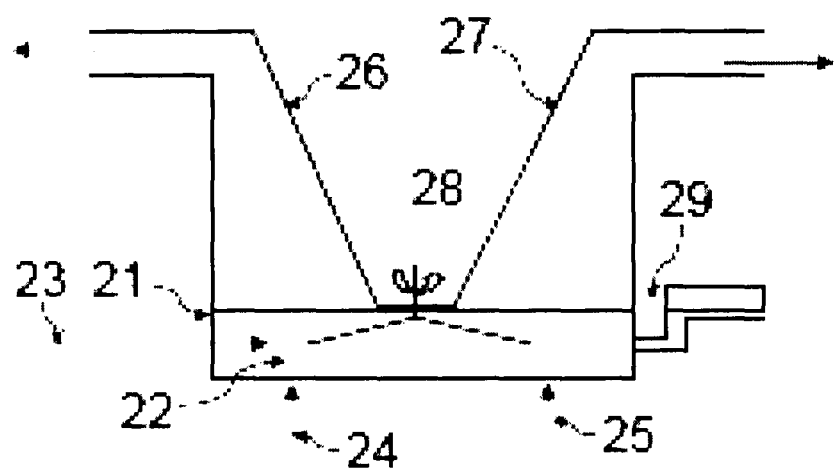

FIG. 2 represents the device according to the invention in the embodiment according to which the combustible gas manufactured is separated from the combustion gases. A tank 21 contains a molten bath of silicate 22 at 1300° C. having a viscosity below 1000 poise, introduced into which, below the surface of the bath, is RCM biomass via an endless screw 23. Steam is introduced into a first zone of the tank via a duct 24, whereas air is introduced into a second zone of the tank quite far from the first zone, via a duct 25. The bath 22 is stirred by a rotary stirrer 28 so that the heat of combustion created in the second zone is supplied to the second zone. A first chimney 26 placed above the first zone collects the combustible gas produced and a second chimney 27 placed above the second zone collects the combustion gases. These combustion gases may be sent to a boiler or a circuit for collecting flue gases of a user furnace in order to recover the heat therefrom. A mixture of vitrifiable materials is continually introduced via the same screw in order to keep the composition of the silicate substantially constant. The silicate is continually discharged as a function of the change in its composition via the channel 29.

Figure 3:
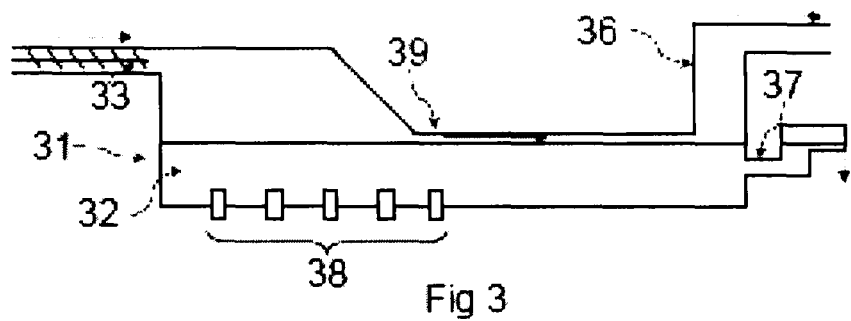

FIG. 3 represents the device according to the invention in the "reverse operation" embodiment according to which the combustible gas manufactured is not separated from the combustion gases and forced to pass into a low zone between the crown and the silicate in order to be reheated. A tank 31 contains a molten bath of silicate 32 at 1300° C. having a viscosity of 50 poise, introduced into which above the surface of the bath is RCM biomass via an endless screw 33. The combustible gas formed mixed with the combustion gas is collected via a single chimney 36. Also introduced continually is a mixture of vitrifiable materials (providing silica, CaO, $Fe_2O_3$) via the screw 33 in order to keep the composition of the silicate substantially constant. The silicate is continually discharged as a function of the change in its composition via the channel 37. The silicate bath is also heated via submerged burners 38 fed with $O_2$ (oxidizer) and cooled combustible gases produced, optionally enriched with other combustible gases which more strongly heat the zone that receives the mass to be gasified and the central zone of the bath (located under the lowered crown). The combustible gas formed is forced to lick this hotter zone of the liquid bath by passing under a lowered part 39 of the crown. Remarkably, it is the $O_2$/combustible gas submerged combustion which is the in situ source of the oxidizing gas comprising water and $CO_2$ which will itself react with the organic material which is found higher up in or on the molten silicate bath. Adding oxidizing gas from outside is not excluded, but this is not essential. Finally, the combustible gas discharged via the chimney 36 contains less than 30% $CO_2$.

Figure 4:
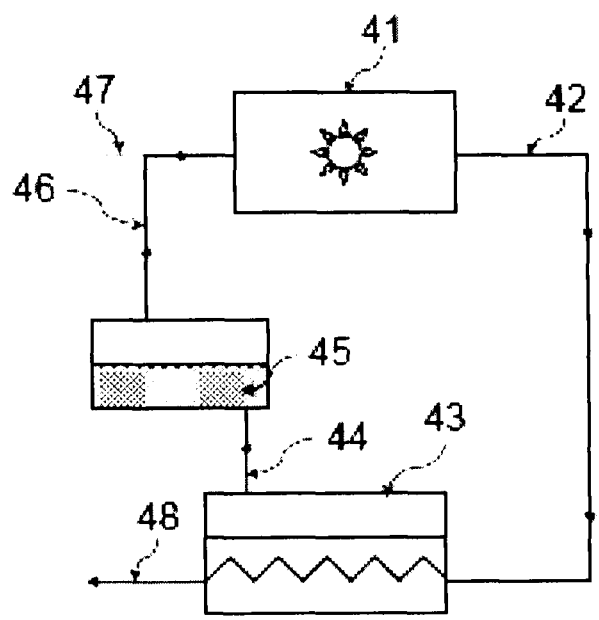

FIG. 4 represents an industrial device that operates in a loop as regards the use of the heat from the flue gases. The device comprises a gas user furnace 41 that burns gas and produces flue gases that escape via 42. These flue gases pass into a boiler 43 in order to vaporize the water which is sent via 44 to the silicate bath 45 operating according to the principle of the invention, the combustible gas produced being conveyed via 46 to the furnace 41 in order to be burnt. The furnace 41 is supplied with gas that comes from the silicate bath, but also from another source 47. The flue gases, after having been used to evaporate the water, are discharged via 48 in the main chimney of the furnace.

EXAMPLE 1

Introduced into the device from FIG. 1 were 9 tons/day of wood residues and 1000 $Nm^3$/h of air charged with 83 vol % of steam in order to provide the gasification. The electrical heat supply within the silicate bath was 500 kW. The wood introduced generated around 3 wt % of ash and 300 kg/day of silicate charged with ash were discharged. The composition (molar %) of the biomass gas was:

$H_2$: 22.3%
$CH_4$: 4.4%
CO: 20.9%

$CO_2$: 18.6%

$N_2$: the complement to attain 100%.

It can be seen, in particular, that more $H_2$ than CO was created.

The gas produced had a lower heating value of 9 MJ/Nm$^3$.

If it is considered that the wood had an energy of 12 MJ/kg, it is estimated that 80% of this energy was recovered by gasification according to the invention.

EXAMPLE 2

The procedure from example 1 was followed except that the air introduced did not contain water. The composition (molar %) of the biomass gas was:

$H_2$: 10.6%
$CH_4$: 3.2%
CO: 30%
$CO_2$: 6%
$N_2$: the complement to attain 100%.

It can be seen that more CO than $H_2$ was created.

The gas produced had a lower heating value of 7 MJ/Nm$^3$. The electric heat supply within the silicate bath was 300 kW.

If it is considered that the wood had an energy of 12 MJ/kg, it is estimated that 80% of this energy was recovered by gasification without steam.

The invention claimed is:

1. A process for manufacturing a combustible gas having a lower heating value of at least 1 MJ/Nm3, the process comprising:
    continuously reacting an oxidizing gas comprising steam, oxygen, and/or CO2 with an organic material in contact with a molten silicate bath held in a tank and providing a heat supply into the molten silicate,
    draining silicate regularly from the tank and introducing vitrifiable materials regularly, thereby renewing the silicate bath,
    wherein an iron content in the bath remains below its precipitation limit by continuously discharging the iron during renewal,
    the silicate bath comprises from 40 to 80% by weight of $SiO_2$,
    and the silicate is at a temperature between 800 and 1700° C.

2. The process as claimed in claim 1, wherein the silicate comprises 60 to 80% by weight of $SiO_2$.

3. The process as claimed in claim 2, wherein the sum of the mass of CaO, of $Fe_2O_3$ and of alkali metal oxide in the silicate ranges from 5 to 60% by weight.

4. The process as claimed in claim 1, wherein the heat supply is a submerged combustion heat supply.

5. The process as claimed in claim 4, wherein an oxidizer for the submerged combustion heat supply comprises more than 80 vol % of pure oxygen.

6. The process as claimed in claim 5, wherein a flame of the submerged combustion heat supply is oxidizing.

7. The process as claimed in claim 5, further comprising generating an oxidizing gas with the submerged combustion heat supply.

8. The process as claimed in claim 5, wherein submerged combustion in the submerged combustion heat supply and the reaction between the oxidizing gas and the organic material are carried out in zones that are sufficiently separated so that the combustion flue gases and the combustible gas can be recovered through different chimneys.

9. The process as claimed in claim 5, wherein a fuel for the submerged combustion comprises the combustible gas manufactured by the process itself, optionally mixed with other combustible gases.

10. The process as claimed in claim 1, wherein the organic material is reacted in a sufficient amount so that a sum of molar percentages of hydrogen and of carbon monoxide in the combustible gas is at least 10%.

11. The process as claimed in claim 1, wherein the oxidizing gas comprises at least 30% by volume of steam.

12. The process as claimed in claim 1, wherein the heat supply is electric.

13. The process as claimed in claim 1, wherein the combustible gas is heated by passing under a lowered crown before being discharged via a chimney.

14. A continuous industrial manufacturing process comprising:
    continuously producing steam in a boiler;
    introducing the steam into a molten silicate bath;
    reacting an oxidizing gas comprising the steam with an organic material in contact with the molten silicate bath to generate combustible gas;
    introducing the combustible gas into an industrial production unit comprising a gaseous fuel burner to combust the combustible gas and to produce a flue gas comprising water and/or steam; and
    introducing the flue gas into the boiler to produce steam, renewing the silicate bath;
    wherein an iron content in the bath remains below its precipitation limit by continuously discharging the iron during renewal,
    the silicate bath comprises from 40 to 80% by weight of $SiO_2$,
    and the silicate is at a temperature between 800 and 1700° C.

15. The process as claimed in claim 14, wherein generating the combustible gas comprises a process for manufacturing a combustible gas having a lower heating value of at least 1 MJ/Nm$^3$, comprising continuously reacting an oxidizing gas comprising steam and/or oxygen and/or $CO_2$ with an organic material in contact with a molten silicate bath held in a tank and comprising a heat supply into the molten silicate, draining silicate regularly from the tank, and introducing vitrifiable materials regularly thereby feeding the silicate bath.

* * * * *